May 4, 1926.
J. W. COATES
1,583,222
WHEEL FOR INDUSTRIAL TRUCKS
Filed Sept. 17, 1925
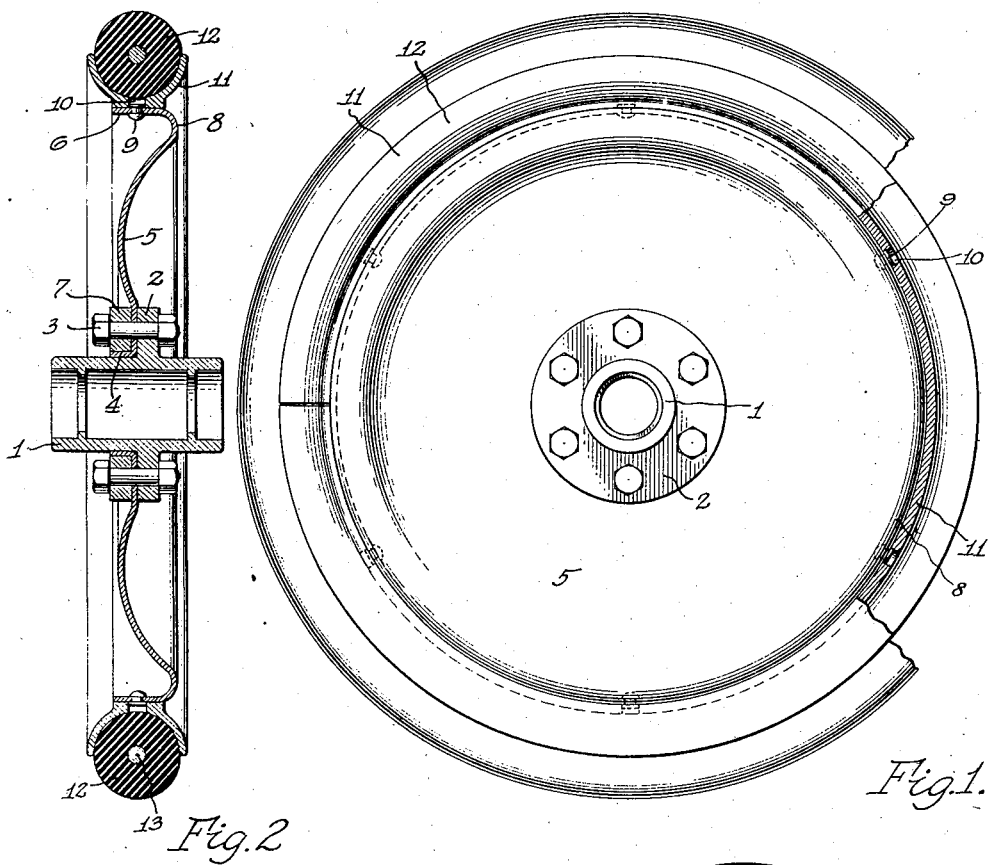
Fig.1.
Fig.2.
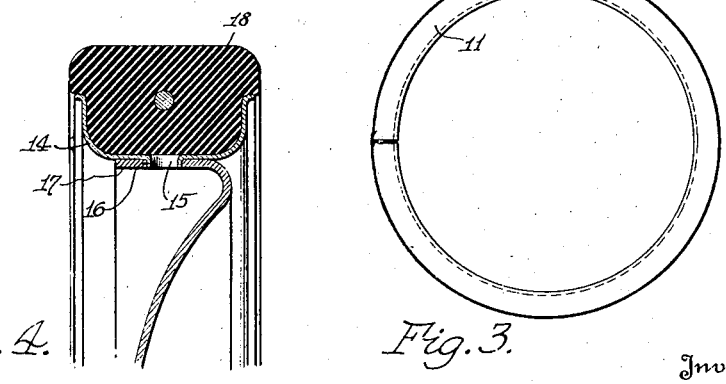
Fig.4.
Fig.3.
Inventor
John W. Coates,
By
Attorneys Patented May 4, 1926.

1,583,222

UNITED STATES PATENT OFFICE.

JOHN W. COATES, OF DETROIT, MICHIGAN.

WHEEL FOR INDUSTRIAL TRUCKS.

Application filed September 17, 1925. Serial No. 56,909.

*To all whom it may concern:*

Be it known that I, JOHN W. COATES, a citizen of the United States, residing at Detroit, in the county of Wayne and State of Michigan, have invented certain new and useful Improvements in Wheels for Industrial Trucks, of which the following is a specification, reference being had therein to the accompanying drawings.

This invention relates to wheels for industrial trucks, especially oil tank trucks that are at filling stations and in industrial plants. There are various other types of small vehicles in connection with which my wheel may be advantageously used, and my invention aims to provide means by which a tire on a wheel may be easily and quickly mounted on or disconnected from the wheel when occasion requires.

Briefly described, the wheel includes a disk body having a peripheral flange for a split tire supporting rim, and means is provided for preventing circumferential shifting or accidental displacement of the rim on the wheel body. In this class of wheels it is not essential that the wheels be anchored by bolts, nuts and the like fasteners because there is very little, if any, lateral strains or stresses on a rim that would have a tendency to displace the same. Small vehicles, such as industrial trucks very seldom skid, consequently the manner of retaining a tire supporting rim on the wheel body may be very much different from what would be required in connection with an automobile wheel or the like.

My invention will be hereinafter specifically described and then claimed, and reference will now be had to the drawing, wherein—

Figure 1 is a side elevation of the wheel partly broken away and partly in section;

Fig. 2 is a cross sectional view of the wheel;

Fig. 3 is a side elevation of a split rim; and

Fig. 4 is a cross sectional view of a portion of a wheel illustrating a modified form.

In the drawing, the reference numeral 1 denotes a hub and intermediate the ends of said hub is an annular flange 2 apertured to receive nut-equipped bolts 3.

Mounted on the hub 1, against the flange 2 is the hub or sleeve portion 4 of a single disk wheel body 5 which has a peripheral flange 6. The disk body is apertured to receive the bolts 3 and a retaining ring 7 is fitted on the hub or sleeve portion 4 to receive the bolts 3 and cooperate therewith in securing the disk body 5 to the hub 1.

The disk body 5 is preferably dished or convexo concave with the greater part of said body within the peripheral flange 6 so that said flange may represent the maximum cross sectional width of the wheel body. The disk body merges into the flange 6 by a rounded portion 8 which will facilitate placing a tire supporting rim on the flange 6.

The flange 6 is provided with a plurality of equally spaced studs 9 and these studs are adapted to extend into openings 10 provided therefore in a split tire supporting rim 11. This rim is semi-circular in cross section and is adapted to support a tire 12, preferably of the solid rubber type reinforced by a metallic core 13, although various other types of tires may be used. This tire can be easily mounted on the rim 11 and the split rim sufficiently sprung to fit over the studs 9. The rounded portion 8 of the disk body will facilitate placing the split rim on the flange 6 and with the studs 9 extending into the openings 10 it is practically impossible for the rim to become accidentally displaced. The resiliency of the split rim, plus that of the tire 12, causes the rim to frictionally grip the body flange 6 and this manner of mounting the rim on the wheel body readily meets the requirements for industrial trucks and small vehicles.

Instead of using the studs 9 I may provide a split sheet metal tire supporting rim 14 with pressed out tubular studs 15 adapted to engage in openings 16 provided therefor in a disk body flange 17. This is shown in Fig. 4, where it will be noted that another type of tire 18 is employed in connection with the rim 14.

It is believed that the utility of my invention will be apparent without further description, and I would have it understood that the structural elements are susceptible to such changes as are permissible by the appended claim.

What I claim is:—

A wheel comprising a disk body having a peripheral flange, a tire supporting rim mounted on the flange of said disk body, and means between said body flange and rim preventing circumferential shifting of the rim on the flange, said rim being split so that it may be sprung on said body flange and cause said means to become effective as a connection between said rim and body flange.

In testimony whereof I affix my signature.

JOHN W. COATES.